(12) United States Patent
Shimomura et al.

(10) Patent No.: US 6,410,492 B1
(45) Date of Patent: Jun. 25, 2002

(54) MIXED ESTERS OF PENTAERYTHRITOL FOR REFRIGERATION BASE OILS

(75) Inventors: Yuji Shimomura, Yokohama; Hiroyuki Hirano, Tokyo, both of (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/786,053

(22) PCT Filed: Sep. 2, 1999

(86) PCT No.: PCT/JP99/04763

§ 371 (c)(1),
(2), (4) Date: Mar. 1, 2001

(87) PCT Pub. No.: WO00/14189

PCT Pub. Date: Mar. 16, 2000

(30) Foreign Application Priority Data

Sep. 2, 1998 (JP) ............................................ 10-248210

(51) Int. Cl.$^7$ ......................... C10M 105/38; C09K 5/04
(52) U.S. Cl. ......................... 508/485; 252/68; 508/304
(58) Field of Search .............................. 252/68; 508/485

(56) References Cited

U.S. PATENT DOCUMENTS

| 5,021,179 A | | 6/1991 | Zehler et al. ................. 252/68 |
| 5,447,647 A | * | 9/1995 | Ishida et al. .................. 252/68 |
| 5,486,302 A | * | 1/1996 | Short ........................... 252/68 |
| 5,494,597 A | * | 2/1996 | Krevalis, Jr. et al. ......... 252/68 |
| 5,681,800 A | | 10/1997 | Duncan et al. ............. 508/485 |
| 5,804,096 A | * | 9/1998 | Sato et al. ..................... 252/68 |
| 5,806,336 A | * | 9/1998 | Sunaga et al. ................ 62/469 |
| 5,833,876 A | * | 11/1998 | Schnur et al. ................ 252/68 |
| 5,906,769 A | * | 5/1999 | Schnur et al. ................ 252/68 |
| 6,221,272 B1 | * | 4/2001 | Schnur et al. ................ 252/68 |
| 6,221,274 B1 | * | 4/2001 | Akahori et al. ............... 252/68 |

FOREIGN PATENT DOCUMENTS

| EP | 0 468 729 A1 | 7/1991 |
| EP | 0 653 479 A1 | 5/1994 |
| JP | 3-128991 | 5/1991 |
| JP | 3-505602 | 12/1991 |
| WO | WO 90/12849 | 11/1990 |

OTHER PUBLICATIONS

Abstract, JP–3–128991, May 31, 1991.

* cited by examiner

*Primary Examiner*—Ellen M. McAvoy
(74) *Attorney, Agent, or Firm*—Finnegan, Henderson, Farabow, Garrett & Dunner, L.L.P.

(57) ABSTRACT

A refrigerator oil comprises an ester obtained from:
  pentaerythritol; and
  a carboxylic acid mixture comprising n-pentanoic acid in an amount of 20 to 50% by mass; n-heptanoic acid in an amount of 20 to 50 % by mass and 3,5,5-trimethylhexanoic acid in an amount of 5 to 60 % by mass, of the total amount of the carboxylic acid mixture.

9 Claims, No Drawings

MIXED ESTERS OF PENTAERYTHRITOL FOR REFRIGERATION BASE OILS

TECHNICAL FIELD

The present invention relates to a lubricating oil for heat transfer devices (the oil being hereinafter referred to as "a refrigerator oil") and, more specifically, it relates to a refrigerator oil having a number of satisfactory and well-balanced performances including lubricity, hydrolysis resistance, heat stability, refrigerant miscibility, electric insulating ability and the like.

BACKGROUND ART

Owing to the restriction of fluorocarbons for preventing ozone layer destruction, efforts are being made to replace chlorine-containing fluorocarbon refrigerant such as CFC-11, CFC-12, HCFC-22 or the like used in refrigerating and air conditioning machines with chlorine-free fluorocarbon refrigerants such as HFC-32, HFC-125, HFC-134a or the like. Since naphthenic oils or paraffinic oils that have been conventionally used as refrigerator oils have not satisfactory refrigerant miscibility, which is one of the requisite performances of a refrigerator oil, when a chlorine-free fluorocarbon refrigerant is used, the researches have been executed to use ester oils instead of naphthenic or parafinic oils. Such ester oil-containing refrigerator oils (referred to as "ester refrigerator oil(s)" hereinafter) are disclosed, for example, in National Publication No. Hei 3-505602 (JP-A 3-505602) of International Publication for Patent Application and Japanese Patent Kokai (Laid-Open) Publication No.3-128992 (JP-A 3-128992).

In addition to the refrigerant miscibility, the refrigerator oils are required to have a number of performances including lubricity, hydrolysis resistance, heat stability, electric insulating ability and the like. However, an ester refrigerator oil having all the above-mentioned performances which are satisfactory and well-balanced has not developed heretofore.

DISCLOSURE OF THE INVENTION

The present invention has been accomplished to solve the above-mentioned technical problems, namely, to develop an excellent ester refrigerator oil having all requisite performances including refrigerant miscibility, lubricity, hydrolysis resistance, heat stability, electric insulating ability and the like. Accordingly, an object of the present invention is to provide a refrigerator oil having all the above-mentioned performances which are achieved in good balance.

As a results of the intensive researches conducted by the present inventors to attain the above described object, it is found that an excellent refrigerator oil having the above-mentioned various performances can be obtained by using a specific ester oil as the base oil.

The refrigerator oil according to the present invention comprises an ester obtained from:
  pentaerythritol; and
  a carboxylic acid mixture comprising n-pentanoic acid in an amount of 20 to 50% by mass; n-heptanoic acid in an amount of 20 to 50% by mass and 3,5,5-trimethylhexanoic acid in an amount of 5 to 60% by mass, of the total amount of the carboxylic acid mixture.

In the refrigerator oil according to the present invention, the contents of n-pentanoic acid, n-heptanoic acid and 3,5,5-trimethylhexanoic acid are preferably within ranges of 25 to 45% by mass, 25 to 45% by mass and 10 to 50% by mass, respectively.

The refrigerator oil according to the present invention further preferably comprises an epoxy compound and/or a phosphorus compound. The epoxy compound is preferably at least one compound selected from a group consisting of phenylglycidyl ether epoxy compounds, glycidyl ester epoxy compounds, alicyclic epoxy compounds and epoxidized aliphatic acid monoesters, among which phenylglycidyl ether epoxy compounds and/or glycidyl ester epoxy compounds are more preferable.

A fluid composition for refrigerators according to the present invention comprises the above-described refrigerator oil according to the present invention and a chlorine-free fluorocarbon.

BEST MODE FOR CARRYING OUT THE INVENTION

The best modes for carrying out the present invention will be explained in detail hereinafter.

The refrigerator oil according to the present invention comprises an ester (hereinafter referred to as "specificester") obtained from pentaerythritol and a carboxylic acid mixture comprising n-pentanoic acid in an amount of 20 to 50% by mass; n-heptanoic acid in an amount of 20 to 50% by mass and 3,5,5-trimethylhexanoic acid in an amount of 5 to 60% by mass, of the total amount of the carboxylic acid mixture.

Taking into particular consideration the miscibility with the refrigerant, the content of n-pentanoic acid in the carboxylic acid mixture is not less than 20% by mass, more preferably not less than 25% by mass and further more preferably not less than 30% by mass, of the total amount of the carboxylic acid mixture. On the other hand, taking into particular consideration the hydrolysis resistance, the content of n-pentanoic acid in the carboxylic acid mixture is not more than 50% by mass, preferably not more than 45% by mass, more preferably not more than 40% by mass, and further more preferably not more than 35% by mass, of the total amount of the carboxyl acid moisture.

Further, taking into particular consideration the lubricity, the content of n-heptanoic acid in the carboxylic acid mixture is not less than 20% by mass, preferably not less than 25% by mass and more preferably not less than 30% by mass, of the total amount of the carboxyl acid mixture. On the other hand, taking into particular consideration the hydrolysis resistance, the content of n-heptanoic acid in the carboxylic acid mixture is not more than 50% by mass, preferably not more than 45% by mass, more preferably not more than 40% by mass and further more preferably not more than 35% by mass, of the total amount of the carboxyl acid mixture.

Further, taking into particular consideration of the hydrolysis resistance, the content of 3,5,5-trimethylhexanoic acid in the carboxylic acid mixture is not less than 5% by mass, preferably not less than 10% by mass and more preferably not less than 15% by mass, of the total amount of the carboxyl acid mixture. On the other hand, taking into particular consideration the miscibility with the refrigerant and the lubricity, the content of 3,5,5-trimethylhexanoic acid in the carboxylic acid mixture is not more than 60% by mass, preferably not more than 50% by mass, more preferably not more than 40% by mass and further more preferably not more than 30% by mass, of the total amount of the carboxyl acid mixture.

The specific ester according to the present invention may be a partial ester wherein a part of hydroxyl groups of pentaerythritol remain un-esterified, whereas a complete ester wherein all the hydroxyl groups of pentaerythritol are esterified is preferable. Further the specific ester according to the present invention may be a mixture of a partial ester and a complete ester.

There is no particular limit in respect to the content of the specific ester in the refrigerator oil according to the present invention, but in order to attain all the well-balanced requisite performances including refrigerant miscibility, lubricity, hydrolysis resistance, heat stability, electric insulating ability and so on, the content of the specific ester is preferably not less than 50% by mass, more preferably not less than 70% by mass, further more preferably not less than 80% by mass and most preferably less than 90% by mass, of the total amount of the refrigerator oil.

The refrigerator oil according to the present invention is an oil comprising the above-described specific ester, whereas it may be used in combination with a hydrocarbon oil such as mineral oils, olefin polymers, naphthalene compounds or alkylbenzenes; or an oxygen-containing synthetic oil such as polyglycols, polyvinyl ethers, ketones, polyphenyl ethers, silicone, polysiloxanes, perfluoro ethers or esters other than the above-described specific esters. The preferable ones among the above-listed oxygen-containing synthetic oils are polyglycols, polyvinyl ethers and ketones.

The refrigerator oil according to the present invention comprising the specific ester and, if required, the hydrocarbon oil and/or the oxygen-containing synthetic oil is principally used as a base oil. The refrigerator oil according to the present invention can be suitably used in the form of a base oil without any additive or used in combination with various kinds of additives according to necessity.

In order to further improve the wear resistance and load capacity, the refrigerator oil according to the present invention may further comprise at least one phosphorus compound selected from a group consisting of phosphoric esters, acidic phosphoric esters, amine salts of acidic phosphoric esters, chlorinated phosphoric esters and phosphorous esters. These phosphorus compounds are esters of phosphoric acid or phosphorous acid and an alkanol or a polyether type alcohol; or are derivatives thereof.

Specifically, the phosphoric esters include, for example, tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylyl phosphate, cresyl diphenyl phosphate, xylyl diphenyl phosphate and the like. The acidic phosphoric esters include, for example, monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, dioleyl acid phosphate and the like. The amine salts of acidic phosphoric esters include, for example, salts of the above acidic phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptyla ine, dioctylamine, trimethylamine, triethylamine, tripropylamine, tributylamine, tripentylamine, trihexylamine, triheptylamine and trioctylamine. The chlorinated phosphoric esters include, for example, tris dichloropropyl phosphate, tris chloroethyl phosphate, tris chlorophenyl phosphate, polyoxyalkylene bis [di(chloroalkyl)] phosphate and the like. The phosphorous esters include, for example, dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, tricresyl phosphite and the like. The mixtures of the above compounds can be used.

In a case where these phosphorus compounds are incorporated into the refrigerator oil according to the present invention, the amount of the phosphorus compounds to be incorporated is not particularly limited, whereas in general the content of the incorporated phosphorus compounds is preferably within a range of 0.01 to 5.0% by mass and more preferably within a range of 0.02 to 3.0% by mass, of the total amount of the refrigerator oil (i.e., the total amount of the base oil and all incorporated additives).

Further, in order to further improve the hydrolysis resistance, the refrigerator oil according to the present invention may further comprise at least one epoxy compound selected from a group consisting of:

(1) phenylglycidyl ether epoxy compounds, (2) alkylglycidyl ether epoxy compounds, (3) glycidyl ester epoxy compounds, (4) allyl oxirane compounds, (5) alkyl oxirane compounds, (6) alicyclic epoxy compounds, (7) epoxidized fatty acid monoesters, and (8) epoxidized vegetable oils.

(1) Phenylglycidyl ether epoxy compounds can be concretely exemplified by phenylglycidyl ether or alkylphenylglycidyl ethers. The alkylphenylglycidyl ethers mentioned here include, for example, those having 1 to 3 alkyl groups each having 1 to 13 carbon atoms, among which those having one alkyl group with 4 to 10 carbon atoms, for example, n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether and the like are preferable.

(2) Alkylglycidyl ether epoxy compounds can be concretely exemplified by decylglycidyl ether, undecylglycidyl ether, dodecylglycidyl ether, tridecylglycidyl ether, tetradecylglycidyl ether, 2-ethylhexylglycidyl ether, neopentylglycoldiglycidyl ether, trimethylolpropanetriglycidyl ether, pentaerythritoltetraglycidyl ether, 1,6-hexanedioldiglycidyl ether, sorbitolpolyglycidyl ether, polyalkyleneglycolmonoglycidyl ether, polyalkyleneglycoldiglycidyl ether and the like.

(3) Glycidyl ester epoxy compounds can be concretely exemplified by phenylglycidyl esters, alkylglycidyl esters, alkenylglycidyl esters and the like, the preferable examples of which include glycidyl-2,2-dimethyloctanoate, glycidyl benzoate, glycidyl acrylate, glycidylmethacrylate and the like.

(4) Allyl oxirane compounds can be concretely exemplified by 1,2-epoxy styrene, alkyl-1,2-epoxy styrene.

(5) Alkyl oxirane compounds can be concretely exemplified by 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1, 2-epoxyicosane and the like.

(6) Alicyclic epoxy compounds can be concretely exemplified by 1,2-epoxycyclohexane, 1,2-epoxycyclopentane, 3,4-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro (1,3-dioxane-5,3'-[7] oxabicyclo[4.1.0])heptane, 4-(1'-methylepoxyethyl)-1,2-epoxy-2-methylcyclohexane, 4-epoxyethyl-1,2-epoxycyclohexane and the like.

(7) Epoxidized fatty acid monoesters can be concretely exemplified by the esters of an epoxidized fatty acid having 12 to 20 carbon atoms and a phenol, an alkylphenol or an alcohol having 1 to 8 carbon atoms. In particular, butyl, hexyl, benzyl, cyclohexyl, methoxyethyl, octyl, phenyl and butylphenyl esters of epoxidized stearic acid are preferably used.

(8) Epoxidized vegetable oil can be concretely exemplified by the epoxy compounds of vegetable oils such as soybean oil, linseed oil, cotton seed oil and the like.

The preferable ones among the above-listed epoxy compounds are phenylglycidyl ether epoxy compounds, glycidyl ester epoxy compounds, alicyclic epoxy compounds and epoxidized fatty acid monoesters, among which phenylglycidyl ether epoxy compounds and glycidyl ester epoxy compounds are more preferable, and phenylglycidyl ether, butylphenylglycidyl ether, alkylglycidyl ester or the mixture thereof is particularly preferable.

When incorporating these epoxy compounds into the refrigerator oil according to the present invention, the amount of the epoxy compounds to be incorporated is not particularly limited, whereas in general the content of the incorporated epoxy compounds is preferably within a range of 0.1 to 5.0% by mass and more preferably within a range of 0.2 to 2.0% by mass, of the total amount of the refrigerator oil (i.e., the total amount of the base oil and all incorporated additives).

The refrigerator oil according to the present invention may be used in combination with the above described phosphorus compounds and epoxy compounds, but in some cases, the combination use of these two kinds of compounds is not preferable due to the possibility of causing the generation of sludge.

Further, in order to improve the performances, the refrigerator oil according to the present invention may be incorporated, as required, with heretofore known additives for a refrigerator oil, for example, phenol-type antioxidants such as di-tert-butyl-p-cresol and bisphenol A; amine-type antioxidants such as phenyl-a-naphthylamine and N,N-di(2-naphthyl)-p-phenylenediamine; wear inhibitors such as zinc dithiophosphate; extreme pressure agents such as chlorinated paraffin and sulfur compounds; oiliness improvers such as fatty acids; antifoaming agents such as silicone-type ones; metal inactivators such as benzotriazole; viscosity index improvers; pour-point depressants; detergent dispersants and so on. These additives may be incorporated into the refrigerator oil singly or jointly. The total amount of the additives added into the refrigerator oil is not particularly limited, whereas in general the content thereof is preferably not more than 10% by mass and more preferably not more than 5% by mass, of the total amount of the refrigerator oil (i.e., the total amount of the base oil and all incorporated additives).

The kinematic viscosity of the refrigerator oil of the present invention is not particularly limited, whereas the kinematic viscosity at 40° C. can preferably be within a range of 3 to 100 mm$^2$/s, more preferably 4 to 50 mm$^2$/s and the most preferably 5 to 40 mm$^2$/s. Further, the kinematic viscosity at 100° C. can preferably be within a range of 1 to 20 mm$^2$/s and more preferably 2 to 10 mm$^2$/s.

Further, the volume resistivity of the refrigerator oil according to the present invention is not particularly limited, whereas it can preferably be not less than $1.0 \times 10^{12}$ Ω·cm, more preferably not less than $1.0 \times 10^{13}$ Ω·cm and the most preferably not less than $1.0 \times 10^{14}$ Ω·cm. Particularly, in a case when the refrigerator oil is used for a closed type refrigerator, high electric insulating ability tends to become requisite. In the present invention, the volume resistivity is represented by the value at 25° C. measured in accordance with JIS C 2101.

The refrigerator oil according to the present invention is particularly useful when a chlorine-free fluorocarbon is used as the refrigerant. The chlorine-free fluorocarbon may be a hydrofluorocarbon (HFC) having 1 to 3 carbon atoms and preferably 1 to 2 carbon atoms, for example, difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) or a mixture of two or more kinds of these HFCs.

The refrigerant is selected in accordance with the use and the requisite performances. For example, single HFC-32; single HFC-23; single HFC-134; single HFC-125, a mixture of HFC-134a/HFC-32=60–80% by mass/40–20% by mass; a mixture of HFC-32/HFC-125=40–70% by mass/60–30% by mass; a mixture of HFC-125/HFC-143a=40–60% by mass/60–40% by mass; a mixture of HFC-134a/HFC-32/HFC-125=60% by mass/30% by mass/10% by mass; a mixture of HFC-134a/HFC-32/HFC-125 =40–70% by mass/15–35% by mass/5–40% by mass; and a mixture of HFC-125/HFC-134a/HFC-143a=35–55% by mass/1–15% by mass/40–60% by mass are preferable. More specific examples include a mixture of HFC-134a/HFC-32=70/30% by mass, a mixture of HFC-32/HFC-125=60/40% by mass; a mixture of HFC-32/HFC-125=50/50% by mass (R410A); a mixture of HFC-32/HFC-125=45/55% by mass (R410B); a mixture of HFC-125/HFC-143a=50/50%by mass (R507C); a mixture of HFC-32/HFC-125/HFC-134a=30/10/60% by mass; a mixture of HFC-32/HFC-125/HFC-134a= 23/25/52% by mass (R407C); a mixture of HFC-32/HFC-125/HFC-134a=25/15/60% by mass (R407E); and a mixture of HFC-125/HFC-134a/HFC-143a=44/4/52% by mass (R404A).

The refrigerator oil of the present invention is also useful when a hydrocarbon is used as the refrigerant. The hydrocarbon refrigerant is preferably a gas at 25° C. under 1 atm, for example, alkane, cycloalkane or alkene having 1 to 5 carbon atoms and preferably 1 to 4 carbon atoms or a mixture thereof. The examples of the hydrocarbon refrigerant include methane, ethylene, ethane, propylene, propane, cyclopropane, butane, isobutane, cyclobutane, methylcyclopropane and the mixtures of two or more kinds of these compounds, among which propane, butane, isobutane and the mixtures thereof are preferable.

Further, the refrigerator oil according to the present invention is also useful when a mixture of the chlorine-free fluorocarbon and the hydrocarbon refrigerant is used as the refrigerant. The mixing ratio of the chlorine-free fluorocarbon and the hydrocarbon is not particularly limited, but if a flame resistant refrigerant is pursued, the ratio of HFC/hydrocarbon is preferably 50–97% by mass/50–3% by mass, more preferably 70–95% by mass/30–5% by mass and particularly preferably 80–90% by mass/20–10% by mass. Further, the most preferable combination is HFC-32/propane, butane and/or isobutane=80–90% by mass/20–10% by mass if taking into consideration the flame resistance and thermodynamic characteristic.

Furthermore, the refrigerator oil according to the present invention is also useful when carbon dioxide is used as the refrigerant.

The refrigerator oil according to the present invention normally exists in the form of a fluid composition for a refrigerator mixed with a refrigerant as describe above when it is used in the refrigerator. The ratio of the refrigerator oil to the refrigerant is not particularly limited, whereas the amount of the refrigerator oil is preferably within a range of 1 to 500 parts by weight and more preferably within a range of 2 to 400 parts by weight per 100 parts by weight of the refrigerant.

The refrigerator oils according to the present invention may be used for lubricating oils for refrigerant compressors in all types of refrigerators, since the present refrigerator oils have an excellent electric characteristic and a low hygroscopicity. Such refrigerators in which the present refrigerator oils are used can be concretely exemplified by an air conditioner for rooms, a package air conditioner, a cold-storage chest (refrigerator), an air conditioner for vehicles, a dehumidifier, a freezer, a freeze and refrigeration warehouse, an automatic vending machine, a showcase, a cooling apparatus in chemical plants and so on. Further, the refrigerator oil according to the present invention is particularly preferable to be used in refrigerators having a closed compressor. Furthermore, the refrigerator oil according to the present invention can be used in all types of compressors including a reciprocating type one, a rotating type one and a centrifugal type one.

EXAMPLES

The present invention will be explained in detail by the following Examples and Comparative Examples, but the present invention is not limited to these Examples.

Example 1–3 and Comparative Example 1–3

The following base oils and additives were blended in the proportions shown in Table 1 to prepare sample oils of Examples 1–3 and Comparative Example 1–3, respectively. The properties of each of the obtained sample oils are shown in Table 1 (kinematic viscosities at 40° C. and 100° C., total acid value and hydroxyl value).

Base oil 1: tetraester of pentaerythritol and a carboxylic acid mixture consisting of n-pentanoic acid (40% by mass), n-heptanoic acid (40% by mass) and 3,5,5-trimethylhexanoic acid (20% by mass)

Base oil 2: tetraester of pentaerythritol and n-pentanoic acid

Base oil 3: tetraester of pentaerythritol and n-heptanoic acid

Base oil 4: tetraester of pentaerythritol and 3,5,5-trimethylhexanoic acid

Additive 1: glycidyl-2,2-dimethyloctanoate

Additive 2: tricresyl phosphate

Next, the following tests were carried out in respect to each of the above-described sample oils.

Refrigerant Miscibility Test 5 g of each of the sample oils was blended with 25 g of the refrigerant (R407C) and the upper critical temperature (the lowest temperature at which the refrigerant and the sample oil dissolve mutually) was measured in accordance with "Refrigerant Miscibility Testing Method" of JIS-K-2211 "Refrigerator oil." The results (upper critical temperature) are shown in Table 1.

Electric Insulating Ability Test

The volume resistivity (at 25° C.) of each of the sample oils was measured in accordance with JIS-C-2101 "Electric Insulating Oil Testing Method." The results are shown in Table 1.

Heat Stability Test 90 g of each of the sample oils, 30 g of the refrigerant (R407C) and catalysts (iron, copper and aluminum wires) were sealed in an autoclave and subsequently heated at 175° C. Two weeks later, the appearances of the sample oils, the appearance of the catalysts, the volume resistivity of the sample oils and the total acid values of the sample oils were measured. The results are shown in Table 1.

Lubricity Test

The sample oils were each applied to a test journal for measuring the amount of the test journal (pin) worn by having the test machine run in at a test oil temperature of 100° C. under a load of 150 lb for 1 minute and then run under a load of 250 lb for 2 hours in accordance with ASTM D 2670 "UFALEX WEAR TEST." The results of the measurement are shown in Table 1.

Hydrolysis Resistance Test 90 g of each of the sample oils, 0.09 g of water and 30 g of the refrigerant (R407C) were introduced into a glass test tube having a volume of 300 ml, then a copper wire, a iron wire and an aluminum wire were placed therein as deterioration accelerating catalysts. Subsequently, the tube was heated in an autoclave made of stainless steel at 175° C. for 168 hours to deteriorate the sample oil. The total acid value of each sample oil after the test was measured and the results are shown in Table 1 together with the total acid values before the test.

TABLE 1

|  |  | Example 1 | Example 2 | Example 3 | Comparative Example 1 | Comparative Example 2 | Comparative Example 3 |
|---|---|---|---|---|---|---|---|
| Base oil | | 1 | 1 | 1 | 2 | 3 | 4 |
| (% by mass) | | 100 | 95.5 | 99 | 100 | 100 | 100 |
| Additive | | — | 1 | 2 | — | — | — |
| (% by mass) | | | 0.5 | 1 | | | |
| Kinematic viscosity | 40° C. (mm$^2$/s) | 28.5 | 28.5 | 28.5 | 15.8 | 21.6 | 115 |
|  | 100° C. (mm$^2$/s) | 5.50 | 5.50 | 5.50 | 3.67 | 4.50 | 11.5 |
| Total acid value (mgKOH/g) | | 0.01 | 0.01 | 0.01 | 0.01 | 0.01 | 0.01 |
| Hydroxyl value (mgKOH/g) | | 0.9 | 2.5 | 2.9 | 0.8 | 1.0 | 1.8 |
| Upper critical temperature (° C.) | | −35 | −34 | −33 | <−50 | −5 | 13 |
| Volume resistivity (Ω · cm) | | $8.7 \times 10^{14}$ | $9.3 \times 10^{14}$ | $4.9 \times 10^{14}$ | $2.3 \times 10^{14}$ | $4.8 \times 10^{14}$ | $1.8 \times 10^{14}$ |
| Heat stability test | Appearance of sample oil | No change | No change | No change | No change | No change | No change |
|  | Appearance of catalyst | No change | No change | No change | Glossy reduced | Glossy reduced | No change |
|  | Volume resistivity (Ω · cm) | $5.4 \times 10^{14}$ | $7.4 \times 10^{14}$ | $2.0 \times 10^{14}$ | $1.8 \times 10^{14}$ | $3.6 \times 10^{14}$ | $1.0 \times 10^{14}$ |
|  | Total acid value (mgKOH/g) | 0.02 | 0.01 | 0.01 | 0.03 | 0.03 | 0.02 |
| FALEX test | Amount of journal worn (mg) | 13 | 14 | 6 | 18 | 15 | 26 |
| Hydrolysis resistance | Total acid value (mgKOH/g) | 0.05 | 0.01 | 0.21 | 0.87 | 0.62 | 0.06 |

It is shown clearly by the results stated in Table 1 that the sample oils in Examples 1 to 3 of the refrigerator oil according to the present invention have the excellent and well-balanced performances including not only the refrigerant miscibility with the chlorine-free fluorocarbon refrigerants but also lubricity, hydrolysis resistance, heat stability, electric insulating ability and kinematic viscosity.

On the contrary, the sample oil of Comparative Example 1 which used tetraester of pentaerythritol and n-pentanoic acid was inferior in lubricity and hydrolysis resistance. Further, the sample oil of Comparative Example 2 which used tetraester of pentaerythritol and n-heptanoic acid was inferior in refrigerant miscibility and hydrolysis resistance. Furthermore, the sample oil of Comparative Example 3 which used tetraester of pentaerythritol and 3,5,5-trimethylhexanoic acid was inferior in refrigerant miscibility and lubricity.

Industrial Applicability

As described above, according to the refrigerator oil of the present invention, the excellent and well-balanced requisite performances including not only the refrigerant miscibility with the chlorine-free fluorocarbon refrigerants but also lubricity, hydrolysis resistance, heat stability, electric insulating ability and the like can be attained.

What is claimed is:

1. A refrigerator oil comprising an ester obtained from: pentaerythritol; and
a carboxylic acid mixture comprising n-pentanoic acid in an amount of 20 to 50% by mass; n-heptanoic acid in an amount of 20 to 50% by mass and 3,5,5-trimethylhexanoic acid in an amount of 5 to 60% by mass, of the total amount of the carboxylic acid mixture.

2. A refrigerator oil according to claim 1, wherein a content of the n-pentanoic acid is 25 to 45% by mass.

3. A refrigerator oil according to claim 1 or 2, wherein a content of the n-heptanoic acid is 25 to 45% by mass.

4. A refrigerator oil according to claim 1, wherein a content of the 3,5,5-trimethylhexanoic acid is 10 to 50% by mass.

5. A refrigerator oil according to claim 1, wherein said refrigerator oil further comprises an epoxy compound.

6. A refrigerator oil according to claim 5, wherein said epoxy compound is at least one compound selected from a group consisting of phenylglycidyl ether epoxy compounds, glycidyl ester epoxy compounds, alicyclic epoxy compounds and epoxidized aliphatic acid monoester.

7. A refrigerator oil according to claim 5, wherein said epoxy compound is at least one compound selected from a group consisting of phenylglycidyl ether epoxy compounds and glycidyl ester epoxy compounds.

8. A refrigerator oil according to claim 1, wherein said refrigerator oil further comprises a phosphorus compound.

9. A fluid composition for refrigerators comprising the refrigerator oil according to claim 1 and a chlorine-free fluorocarbon.

* * * * *